(12) United States Patent
Symeonakis (10) Patent No.: US 12,212,464 B2
(45) Date of Patent: Jan. 28, 2025

(54) GENERATING USER INTERFACE ELEMENTS BASED ON DATA SCHEMA FILES

(71) Applicant: Nintex UK Ltd., London (GB)

(72) Inventor: Lambros Symeonakis, Melbourne (AU)

(73) Assignee: Nintex UK Ltd., London (GB)

( * ) Notice: Subject to any disclaimer, the term of this patent is extended or adjusted under 35 U.S.C. 154(b) by 289 days.

(21) Appl. No.: 17/375,714

(22) Filed: Jul. 14, 2021

(65) Prior Publication Data

US 2023/0013547 A1    Jan. 19, 2023

(51) Int. Cl.
| | |
|---|---|
| *G06F 16/00* | (2019.01) |
| *G06F 3/0484* | (2022.01) |
| *G06F 16/21* | (2019.01) |
| *G06F 16/25* | (2019.01) |
| *H04L 41/0869* | (2022.01) |

(52) U.S. Cl.
CPC ........ *H04L 41/0869* (2013.01); *G06F 3/0484* (2013.01); *G06F 16/21* (2019.01); *G06F 16/25* (2019.01)

(58) Field of Classification Search
CPC ........ G06F 16/21; G06F 16/25; G06F 3/0484; G06F 3/0482; G06F 3/04842; G06F 8/38; G06F 16/211; H04L 41/0869
USPC .......................................................... 707/805
See application file for complete search history.

(56) References Cited

U.S. PATENT DOCUMENTS

| | | | | |
|---|---|---|---|---|
| 7,058,886 | B1 * | 6/2006 | Sulistio | G06Q 10/10 707/E17.117 |
| 2007/0143471 | A1 * | 6/2007 | Hicks | H04L 41/0853 709/224 |
| 2008/0109715 | A1 * | 5/2008 | Stover | G06F 16/958 707/999.102 |
| 2009/0254812 | A1 * | 10/2009 | Vion-Dury | G06F 40/154 715/239 |
| 2012/0192153 | A1 * | 7/2012 | Venkatraman | G06F 11/3664 717/124 |

(Continued)

FOREIGN PATENT DOCUMENTS

CN        106775725 B  * 12/2020  .............. G06F 8/33

OTHER PUBLICATIONS

Implementations; JSON Schema; https://json-schema.org/implementations.html#/web-ui-generation; retrieved Oct. 8, 2021 (10 pages).

(Continued)

*Primary Examiner* — Dinku W Gebresenbet
(74) *Attorney, Agent, or Firm* — Perkins Coie LLP (57)    ABSTRACT

Methods and systems for improved generation of user interfaces based on data schemas are provided. In one embodiment, a method is provided that includes receiving a data schema file and identifying a data schema within the data schema file. The data schema file may identify valid data for a computing service, such as an API. The data schema may be provided to a validation service, which may test whether a plurality of sentinel values comply with the data schema. An error message may be received from the validation service and a user interface element may be selected based on the error message. The user interface element may be added to the user interface.

20 Claims, 7 Drawing Sheets

(56) References Cited

U.S. PATENT DOCUMENTS

| | | | | |
|---|---|---|---|---|
| 2014/0207826 A1* | 7/2014 | Gao | ................... | G06F 16/211 |
| | | | | 707/803 |
| 2014/0365999 A1* | 12/2014 | Puz | ..................... | G06F 8/30 |
| | | | | 717/120 |
| 2015/0161193 A1* | 6/2015 | Damodar | ............ | G06F 16/2365 |
| | | | | 707/694 |
| 2020/0241942 A1* | 7/2020 | Crouse | ................... | G06F 9/544 |
| 2021/0103633 A1* | 4/2021 | Sardo | ..................... | G06F 40/16 |
| 2021/0165797 A1* | 6/2021 | Shek | ................ | G06F 16/24573 |
| 2022/0076263 A1* | 3/2022 | Sevastyanov | ........ | G06Q 20/108 |

OTHER PUBLICATIONS

A React component for building Web forms from JSON Schema; rjsf-team/react-jsonchema-form; https://github.com/json-schema-form/angular-schema-form/blob/development/docs/index.md; retrieved Oct. 8, 2021 (3 pages).

json-schema-form / angular-schema-form; https://github.com/rjsf-team/react-jsonschema-form; retrieved Oct. 8, 2021 (43 pages).

Extend an OpenAPI definition for a custom connector; https://docs.microsoft.com/en-us/connectors/custom-connectors/openapi-extensions; retrieved Oct. 8, 2021 (22 pages).

\* cited by examiner

FIG. 1

```
Schema 202

{
    "title": "Simple String",         ─── 204
    "type":"string"                    ─── 206
}
```

FIG. 2A

```
Schema 210

{
    "title": "Complex String",                              ─── 212
    "anyOf:" [                                              ─── 214
        {
            "oneOf:" [                                      ─── 216
                {
                    "allOf": [                              ─── 218
                        {"not": {"type": ["number", "object", "null"]}},      220
                        {"not": {"type": ["boolean", "array", "integer"]}}
                    ]                                                          222
                }
            ]
        }
    ]
}
```

GENERATING USER INTERFACE ELEMENTS BASED ON DATA SCHEMA FILES

BACKGROUND

Software applications may communicate with one or more additional computing services while performing designated operations. For example, a software application may communicate with additional computing services executing on the same computing device, on a computing device within the same network (e.g., the same local network), and/or on a computing device accessible via a global network (e.g., the Internet). In such instances, the additional computing services may require data to be provided in a specific format and/or with specific, predetermined contents.

SUMMARY

The present disclosure presents new and innovative systems and methods for generating user interfaces based on data schema files. In a first aspect, a method is provided that includes receiving a data schema file identifying valid data for a computing service and identifying a first data schema within the data schema file. The first data schema may be provided to a validation service that is configured to determine whether received data complies with the first data schema and the validation services may test a plurality of sentinel values for compliance with the first data schema. The method may further include receiving an error message from the validation service, selecting a user interface element based on the error message, and adding the user interface element to the user interface.

In a second aspect according to the first aspect, the plurality of sentinel values include at least one of (i) base values for a plurality of data types supported by the data schema file, (ii) base values for a plurality of data formats for at least one data type, and (iii) at least one random value.

In a third aspect according to at least one of the first and second aspects, the data schema file is a JSON Schema file and the plurality of data types include at least a subset of string, number, enum, array, boolean, and/or null data types.

In a fourth aspect according to any of the first through third aspect, the method further includes creating a feature map based on the error message that identifies at least one valid data type for the first data schema and selecting the user interface element based on the at least one valid data type identified by the feature map.

In a fifth aspect according to any of the first through fourth aspect, creating the feature map includes determining that a first sentinel value corresponding to a first data type did not result in the error message and adding the first data type to the feature map as a valid data type.

In a sixth aspect according to any of the first through fifth aspect, creating the feature map includes determining that a second sentinel value corresponding to at least a second data type resulted in the error message and at least one of (i) omitting the second data type from the feature map and (ii) adding the second data type to the feature map as an invalid data type.

In a seventh aspect according to any of the first through sixth aspects, creating the feature map includes identifying a contents requirement within the error message and identifying a third data type that corresponds to the contents requirement. The third data type may be added to the feature map as a valid data type and the contents requirement may be stored in association with the third data type.

In an eighth aspect according to any of the first through seventh aspects, the user interface element has at least one of a formatting constraint created based on the contents requirement and/or a contents constraint created based on the contents requirement.

In a ninth aspect according to any of the first through eighth aspect, the contents requirement identifies a predetermined set of valid contents and the user interface element is a selection element that contains the predetermined set of valid contents.

In a tenth aspect according to any of the first through ninth aspects, the user interface element is selected to be at least one of (i) a text box if the at least one valid data type includes a string data type and/or a number data type, (ii) a selection element if the contents requirement includes an enumerated list of valid contents, and/or (iii) a slider if the at least one valid data type includes a number data type.

In an eleventh aspect according to any of the first through tenth aspects, if the at least one valid data schema indicates two or more valid data types, the user interface element includes (i) a first element to select between the two or more valid data types and (ii) a second element that is displayed based on a selected data type of the selection element.

In a twelfth aspect according to any of the first through eleventh aspects, the first data schema includes at least one composite condition that combines two or more data requirements.

In a thirteenth aspect according to any of the first through twelfth aspects, the data schema file identifies valid data for an application programming interface (API).

In a fourteenth aspect according to any of the first through thirteenth aspects, the data schema file identifies valid data that can be provided to and/or received from the API.

In a fifteenth aspect according to any of the first through fourteenth aspect, the API executes on a first computing device and the data schema file is received from the API when the API is connected to a second computing device.

In a sixteenth aspect, a system is provided that includes a processor and a memory. The memory may store instructions which, when executed by the processor, cause the processor to receive a data schema file identifying valid data for a computing service and identify a first data schema within the data schema file. The instructions may further cause the processor to provide the first data schema to a validation service configured to determine whether received data complies with the first data schema and use the validation service to test a plurality of sentinel values for compliance with the first data schema. An error message may be received from the validation service, and the instructions may further cause the processor to select a user interface element based on the error message and add the user interface element to the user interface.

In a seventeenth aspect according to the sixteenth aspect, the instructions further cause the processor to create a feature map based on the error message that identifies at least one valid data type for the first data schema and select the user interface element based on the at least one valid data type identified by the feature map.

In an eighteenth aspect according to any of the sixteenth through seventeenth aspects, the instructions further cause the processor, while creating the feature map, to determine that a first sentinel value corresponding to a first data type did not result in the error message and add the first data type to the feature map as a valid data type.

In a nineteenth aspect according to any of the sixteenth through eighteenth aspects, the instructions further cause the processor, while creating the feature map, to determine that a second sentinel value corresponding to at least a second data type resulted in the error message and at least one of (i) omit the second data type from the feature map and (ii) add the second data type to the feature map as an invalid data type.

In a twentieth aspect according to any of the sixteenth through nineteenth aspects, the instructions further cause the processor, while creating the feature map, to identify a contents requirement within the error message and identify a third data type that corresponds to the contents requirement. The instructions may also cause the processor to add the third data type to the feature map as a valid data type, wherein the contents requirement is stored in association with the third data type.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Data formats used to communicate with other computing services may be specified using data schema formats. For example, a computing service may specify compatible data formats within a JSON Schema file or other similar data schema file. The data schema file may specify data type requirements, formatting requirements, and/or contents requirements for one or more fields. Data that does not comply with these requirements may result in an error from the computing service instead of processing the transmitted data as desired.

Additionally, certain applications may include user interfaces (e.g., graphical user interfaces depicted on a display of a computing device) that may be used to configure the computing programs. For example, a user interface may be provided for a software application that enables a user to connect to other computing services. Such user interface may also enable a user to configure data provided to or received from the computing services. In instances where the computing services have corresponding data schema requirements, it may be desirable for the user interface to enable a user to only specify compatible data formats. However, in order to restrict the user interface associated with a particular computing service in this way, the data schema for the corresponding computing service must be known and parsed to determine the requirements for each field of the data schema. Existing systems may include user interface pages generated manually based on received data schemas. However, these systems cannot scale well and cannot provide an adequate user interface if a user connects an application to a new computing service for which a user interface has not been generated. Therefore, there exists a need to automatically generate user interfaces based on data schema files received from computing services.

Certain existing systems, such as Alpaca Forms, Angular Schema Form, Dashjoin JSON Schema Form, React JSON Schema Form, and Liform-react attempt to solve this problem by parsing the contents of data schema files to determine compatible data types for each field of the data schema file. However, these systems are often error prone and have difficulty parsing more complex data schema. For example, JSON Schema allows for composition conditions that combine multiple data requirements in various ways. JSON Schema supports allOf, oneOf, and anyOf conditions that respectively constrain fields to meet all of the specified conditions, only one of the specified conditions, and any of (i.e., one or more of) the specified conditions. In practice, such specifications can get very complex. For example, JSON Schema also allows for schemas to cross reference or incorporate one another. This can allow for multiple schemas to be stacked, which may result in many of these composition conditions being combined with one another. Because existing systems attempt to parse the contents of the data schema files, these systems often fail to accurately process such complex data schema due to the increased complexity.

One solution to this problem is to process received data schema files using a validation service rather than attempting to parse the contents of the data schema file itself. For example, the data schema file (or a particular data schema within the data schema file) may be provided to a validation service. The validation service may be configured to compare received data to data schema files and determine whether the contents of the received data comply with the requirements of the data schema. The validation service may also be provided with sentinel values, which may be selected to cover a range of possible inputs or input constraints on the data schema. For example, the sentinel values may cover all possible data types for the data schema (e.g., all data types supported by JSON Schema for a JSON Schema data schema file). The sentinel values may also cover certain extreme values for certain data types that may be constrained by the data schema (e.g., long strings, short strings, large numbers/integers, small numbers/integers, empty values). In response to the various sentinel values, the validation service may produce one or more error messages in response to determining that one or more of the sentinel values violate or are otherwise incompatible with the data schema. These error messages may then be parsed to determine compatible data types and other constraints provided by the data schema (e.g., enum values, length constraints, value constraints). Based on the compatible data types, a user interface element may be selected that only allows a user to enter compatible data (e.g., compatible data types, compatible data contents). This helps ensure that users are only able to configure data sources and data values that comply with the data schema, ensuring that only compatible data values are received.

Figure 1:
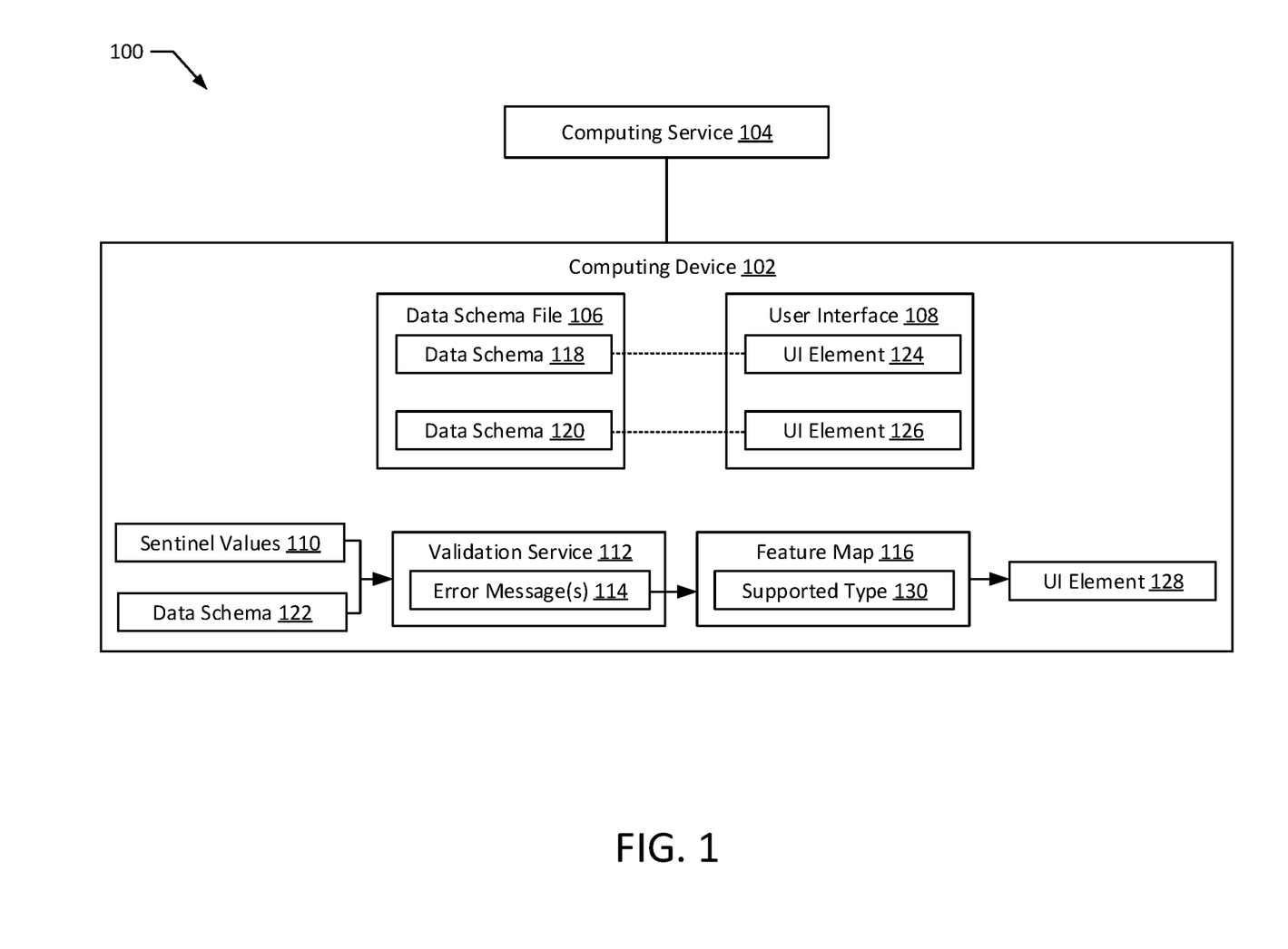
FIG. 1 illustrates a system according to an exemplary embodiment of the present disclosure.

FIG. 1 illustrates a system 100 according to an exemplary embodiment of the present disclosure. The system 100 may be configured to receive and process data schema files from computing services to generate user interfaces associated with the computing services. The system 100 includes a computing device 102 and a computing service 104. The computing device 102 may be used to configure access to a computing service 104. For example, the computing device 102 may receive a data schema file 106 from the computing service 104. The data schema file 106 may be received in response to a user request to connect an application (e.g., a software application executing on the computing device 102 and/or a computing device associated with a user) to the computing service 104. In response, the computing device 102 may query the computing service 104 (e.g., at an application programming interface (API) endpoints). The computing service 104 may in turn respond with the data schema file 106.

The data schema file 106 may specify one or more data requirements (e.g., contents requirements, formatting requirements, data type requirements) for one or more fields of data received by the computing service 104. For example, the data schema file 106 includes data schemas 118, 120, which may correspond to separate fields of data that may be received by the computing service 104. The data schema file 106 may be prepared in one or more formats. For example, the data schema file 106 may be a JSON Schema file. The data requirements may concern one or more data types, such as numbers (e.g., integers, float numbers), objects, strings, arrays, booleans, and null data. Furthermore, as explained below, data requirements may include one or more composition conditions that combine one or more requirements, such as requiring all of a plurality of conditions to be met (e.g., an allOf condition), requiring any of a plurality of conditions to be met (e.g., an anyOf condition), and/or requiring only one of a plurality of conditions to be met (e.g., a oneOf condition). Data requirements may also include contents requirements that limit the acceptable contents of the data (e.g., may specify a string of a particular length, numbers within a particular range, specific acceptable strings, specific acceptable numbers).

The computing device 102 may be configured to generate a user interface 108 corresponding to the data schema file 106. For example, the user interface 108 may be generated to correspond to the computing service 104. A user may subsequently use the user interface 108 to specify data provided to and/or data received from the computing service 104. For example, a user may use the user interface 108 to link the computing service 104 to other operations (e.g., performed by an application associated with the user). In certain particular instances, the user interface 108 may be provided to control data provided by or received by Nintex Workflow Cloud. To enable the user to specify data entered into each field for the computing service 104, each data schema 118, 120 within the data schema file 106 may include a corresponding UI element 124, 126. The user may interact with the UI elements 124, 126 to specify particular data sources or particular data contents for each of the fields.

The computing device 102 also includes a validation service 112. The computing device 102 may use the validation service 112 to generate or select corresponding UI elements for the user interface 108. The validation service 112 may be configured to receive a data schema and particular data values and to process the received data values using the data schema to determine whether the received data values comply with the data schema. In practice, the validation service 112 may be implemented as one or more of the Ajv JSON Schema Validator, the Pure Lua JSON Schema Validator, and/or similar validator services.

To generate a corresponding element 128 for a data schema 122 (e.g., the data schema 122 of the data schema file 106), the computing device 102 may provide the data schema 122 to the validation service 112 along with multiple sentinel values 110. Sentinel values 110 may be predetermined sets of values in one or more data types that are used to test for requirements within data schema 122. The sentinel values 110 may be selected to test for each of the data types supported by the data schema file 106. For example, where the data schema file 106 is a JSON Schema file, the sentinel values 110 may test for each of the string, number, array, boolean, and null data types. For example, the sentinel values 110 may include one or more strings, one or more numbers, one or more arrays, one or more booleans, and/or one or more null data values. In certain implementations, the sentinel values 110 may include base values for string, number, array, boolean, and/or null data types. As discussed in greater detail below, the sentinel values 110 may also include one or more extreme or erroneous values. After processing one or more of the sentinel values 110 with the data schema 122, the validation service 112 may generate one or more error messages 114. The error messages 114 may specify an erroneous value from the sentinel values 110 and a type of error detected by the validation service 112. For example, and as discussed in greater detail below, the error messages 114 may specify that a particular sentinel value contains an incompatible data type for the data schema 122. As another example, the error messages 114 may specify that a particular sentinel value contains a number that is outside of an acceptable range for the data schema 122.

Based on the error messages 114, the computing device 102 may generate a feature map 116 identifying one or more supported types 130 for the data schema 122. The feature map 116 may be generated by parsing the error messages 114. For example, the error messages 114 may specify one or more incompatible types (e.g., "ERROR: Data type boolean not allowed.") and/or incompatible data contents (e.g., "ERROR: Number '1243785760' not permitted. Acceptable range: 1-100."). The computing device 102 may then parse the contents of the error messages for particular keywords (e.g., "data type", "not allowed", "acceptable range") and may analyze the contents of the error messages surrounding the keywords for associated data type and/or contents requirements. The supported type 130 indicated by the feature map 116 may identify one or more supported data types and/or supported data contents for the data schema 122. Continuing the previously-discussed example, the supported type 130 may indicate that data type numbers are supported for the data schema 122, but that the supported data contents are only for numbers ranging from 1-100.

Based on the feature map 116 and the supported types 130, the computing device 102 may generate a UI element 128 corresponding to the data schema 122. The UI element 128 may be selected based on supported data types identified by the feature map 116. For example, the UI element 128 may be selected as a text box if the data schema 122 supports strings and/or numbers. As another example, the UI element 128 may be selected as a selection box or drop-down menu if boolean data types are supported. The UI element 128 may also be selected based on supported data contents. For example, if the data schema 122 only supports numbers ranging from 1-10, the UI element 128 may be selected as a slider that ranges from 1-10. Additional example UI elements are discussed below.

This process may be repeated for each of the data schemas 118, 120, 122 within the data schema file 106 to generate the user interface 108. For example, the computing device 102 may identify a UI element 124, 126, 128 corresponding to each of the data schemas 118, 120, 122. The UI elements 124, 126, 128 may be ordered within the user interface 108 according to the order of the corresponding data schemas 118, 120, 122 within the data schema file 106. For example, the data schema 118 may occur above the data schema 120 within the data schema file 106, and the UI element 124 may therefore be added above the UI element 126 within the user interface 108. In this way, the computing device 102 may generate the user interface 108 automatically based on the received data schema file 106 without having to parse the structure of the data schemas 118, 120, 122 themselves. The user interface 108 may then be provided to a user for use in connecting the computing service 104 to another software application while also ensuring compatibility of the data provided received by the software application with the data schema file 106 and the computing service 104.

The computing device 102 and/or the computing service 104 may also include a processor and a memory, which may implement one or more aspects of the computing device 102 and/or the computing service 104. For example, the memory may store instructions which, when executed by the processor, may cause the processor to perform one or more operational features of the computing device 102 and/or the computing service 104. The processor may be implemented as one or more central processing units (CPUs), field programmable gate arrays (FPGAs), and/or graphics processing units (GPUs) configured to execute instructions stored on the memory. In certain instances, the validation service 112 may be implemented by a separate computing device from the computing device 102. Additionally or alternatively, the user interface 108 may be displayed by the computing device 102 and/or another, separate computing device.

Additionally, the computing device 102 and the computing service 104 may be configured to communicate using a network. For example, the computing device 102 and the computing service 104 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1 and/or a global network (e.g., the Internet).

Figure 2A:
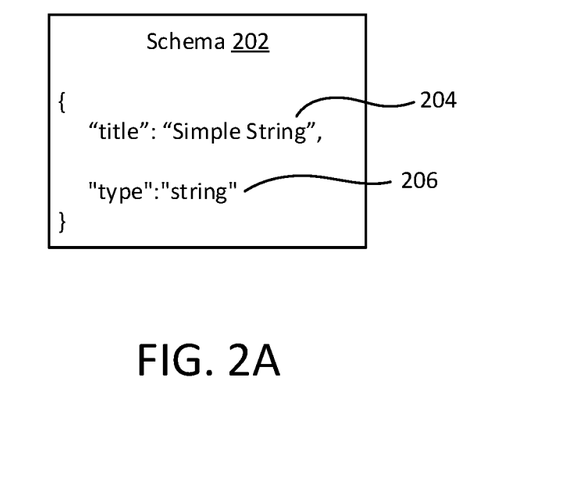
FIGS. 2A-2B illustrate schemas according to exemplary embodiments of the present disclosure.
Figure 2B:
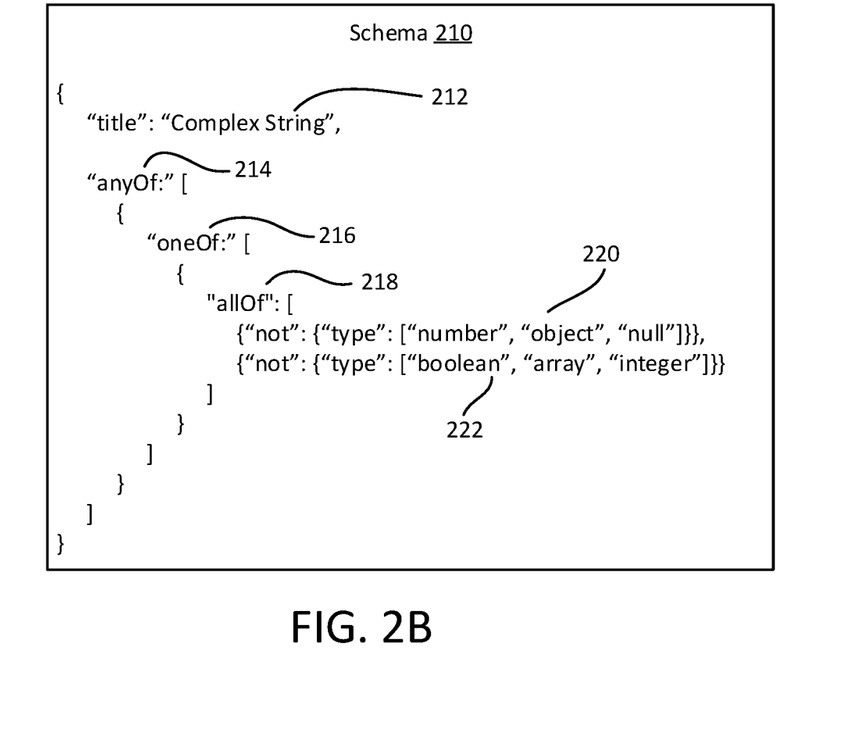

FIGS. 2A-2B illustrate schemas 202, 210 according to exemplary embodiments of the present disclosure. The schemas 202, 210 may represent exemplary embodiments of data schemas 118, 120, 122 contained within a data schema file 106 and processed by a computing device 102 to generate a user interface 108. Both of the data schemas 202, 210 may be functionally equivalent, specifying that strings are the only accepted data type for a corresponding data field within a data schema file. However, the schema 210 may be an example of a more complicated data schema whose accepted data types can only be derived by deciphering various composite conditions. For example, the schema 210 may be an expanded form of one or more combined data schemas, each with their own corresponding requirements.

Focusing on FIG. 2A, the schema 202 includes a title 204 and one requirement 206. The title 204 may indicate a name for the data field that corresponds to the schema 202. As depicted, the title 204 of the schema 202 is "Simple String". The requirement 206 may specify any conditions that data for the field are required to meet to maintain compatibility with the schema 202. As depicted, the only requirement for schema 202 is that the data have type string, indicating that only data containing strings are acceptable for compliance with the schema 202.

Turning to FIG. 2B, the schema 210 has a title 212, composite conditions 214, 216, 218, and requirements 220, 222. The title 212 for the schema 210 indicates that the corresponding data field is titled "Complex String". Composite conditions may be used to combine one or more subsidiary requirements. Furthermore, as depicted, composite conditions may be stacked or combined with one another to further limit or control the types of acceptable data within the schema 210. As depicted, the schema 210 includes an anyOf condition 214, which contains a oneOf condition 216, which further contains an allOf condition 218. As will be appreciated by one skilled in the art, the combined composite conditions 214, 216, 218 ultimately require that all of the requirements 220, 222 contained by the allOf condition 218 be met. Each of these requirements 220, 222 includes a not condition, which negates the requirements contained within. In particular, the requirements 220 specifies that the data type not be a number, an object, or null and the requirement 222 specifies that the data type not be a Boolean, an array, or an integer. When combined (according to the allOf condition 218), the requirements 220, 222 specify that the data type not to be a number, object, null, Boolean, array, or integer. Thus, the only acceptable data type is a string.

Systems that are designed to structurally parse data schemas may struggle with schemas that combine one or more requirements and/or one or more composite conditions. Such systems may, for example, incorrectly parse the requirements 220, 222 as corresponding to separate user interface elements. Additionally or alternatively, the nested composite conditions 214, 216, 218 may cause such systems to create unnecessary nested selection elements, further complicating and obfuscating the acceptable types of data. These systems may thus struggle with complex data schemas, including data schemas formed from multiple other schemas (e.g., data schema templates).

Figure 3A:
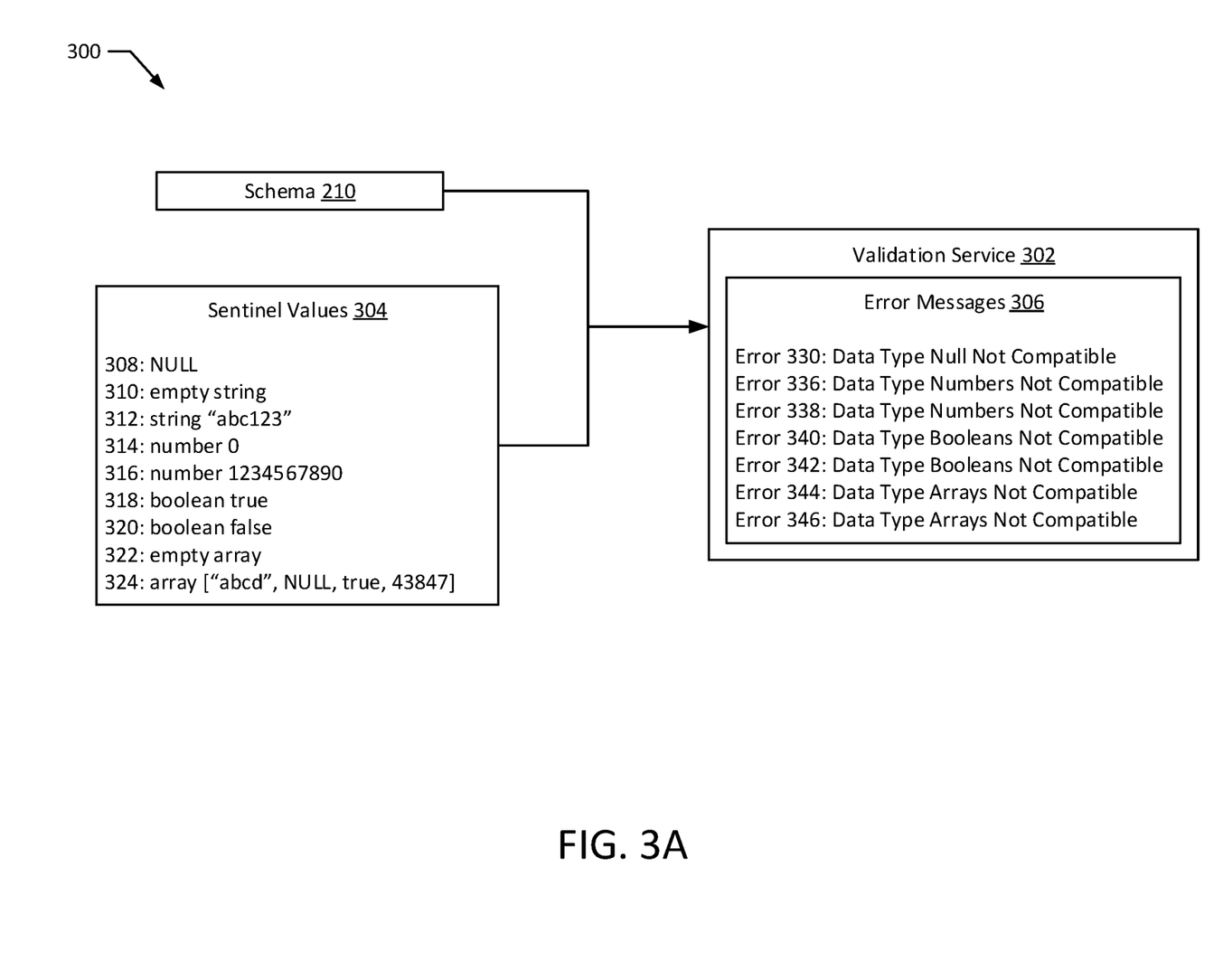
FIGS. 3A-3B illustrate a user interface element generation procedure according to an exemplary embodiment of the present disclosure.
Figure 3B:
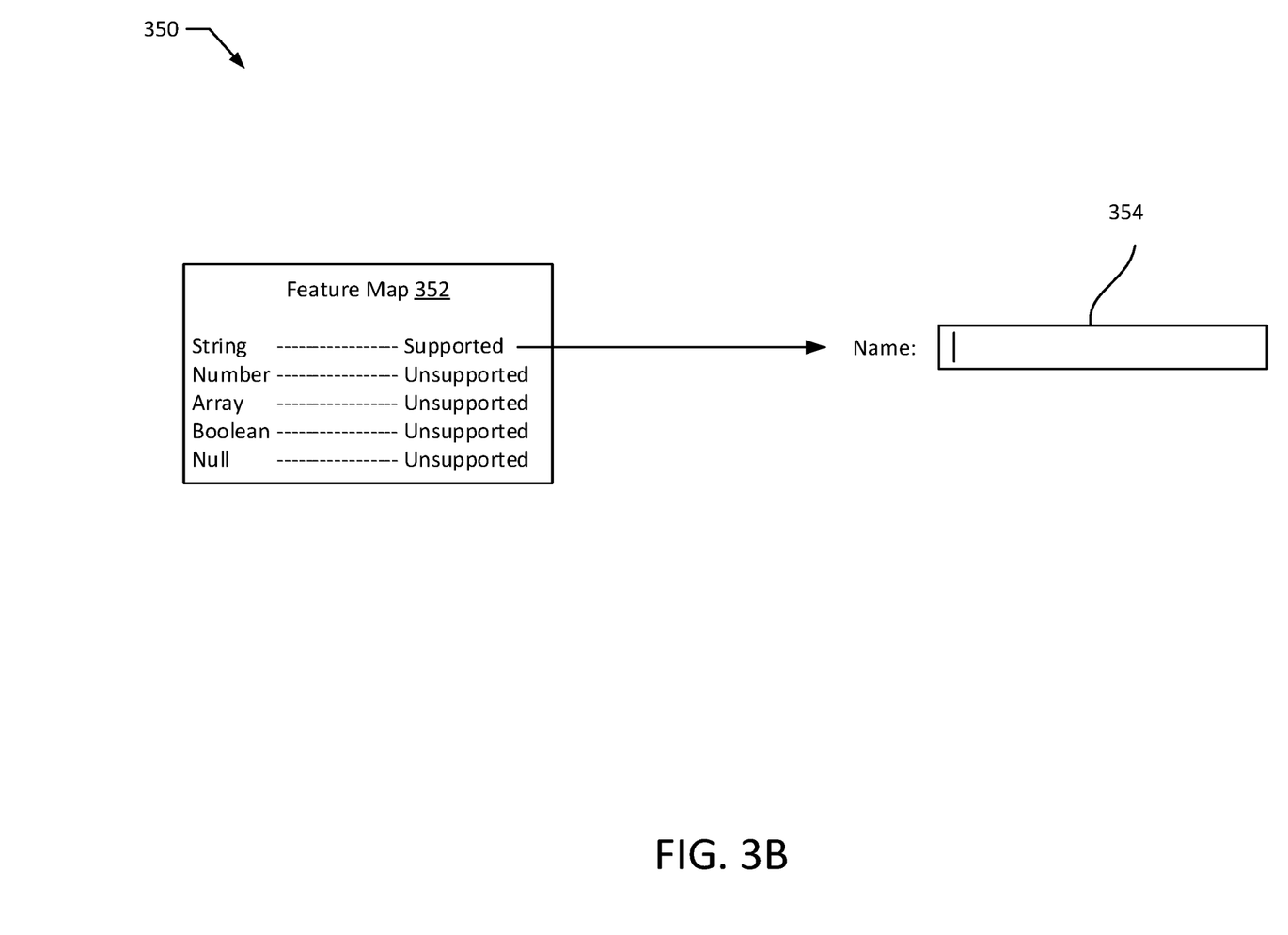

FIGS. 3A-3B illustrate processes 300, 350 of a user interface element generation procedure according to an exemplary embodiment of the present disclosure. The processes 300, 350 depict a procedure that may be performed to process the schema 210 in order to identify a corresponding UI element 354. The schema 210 is provided to a validation service 302, which may be an exemplary implementation of the validation service 112, along with multiple sentinel values 304. The sentinel values 304 include multiple values 308, 310, 312, 314, 316, 318, 320, 322, 324 that the validation service 302 may test for compliance with the schema 210. The sentinel values 304 may include data values of different types. For example, the value 308 is null, the values 310, 312 are strings, the values 314, 316 are numbers, the values 318, 320 are booleans, and the values 322, 324 are arrays. Furthermore, the sentinel values 304 may be selected to test different values for data of different types. These values may include empty or base values for the various data types. For example, the value 310 is an empty string, the value 314 is the number zero, and the value 322 is in empty array. Such empty or base values may test the received schema 210 to ensure that these values are not restricted (e.g., that data contents are not required or that empty values are not prohibited). The sentinel values 304 may also include populated data fields for the different data types. For example, the value 312 includes a string with the contents "abc123" and the values 318, 320 test both boolean values true and false. Such data types may test to ensure that data contents are not restricted (e.g., to certain strings; to strings of a certain length; to strings with a certain number of letters, numbers, capital letters, and/or symbols). Accordingly, in certain instances, strings such as the value 312 may be selected to contain random values (e.g., mixes of different types of characters). The populated data fields may also test for different ranges of values (e.g., for numerical data types). For example, the value 316 includes a large number 1234567890. Such a large number may test whether the data schema 210 restricts numbers to a certain maximum value. Although not depicted, similar values may be selected to include large negative numbers and/or floating point numbers to test whether the schema 210 restricts minimum values and/or is limited to integer numbers. Values may also include other common restrictions within data schema. For example, the value 324 includes an array that mixes multiple data types, including one string, one null value, one Boolean, and one number. Such values 324 may test whether contents of arrays are restricted within schemas that support arrays.

The values 308, 310, 312, 314, 316, 318, 320, 322, 324 for the sentinel values 304 are merely exemplary. In additional or alternative implementations, the specific values used as a sentinel values 304 may differ. For example, sentinel values may be selected to include more values for each data type, to include particular numerical values and/or particular strings, or to include any modification or alteration to different data values discussed herein.

The validation service 302 may receive the schema 210 and the sentinel values 304 and may process the sentinel values 304 according to the data schema 210. In particular, the validation service 302 may determine whether each of the values 308, 310, 312, 314, 316, 318, 320, 322, 324 comply with restrictions specified by the data schema 210. For example, validators may compile the data schema 210 into a function and may test each of the values 308, 310, 312, 314, 316, 318, 320, 322, 324 with the function. Any error messages generated by testing these values may be included within the error messages 306.

In response to determining that one of the sentinel values 304 does not comply with at least one of the requirements of the schema 210, the validation service 302 may present one or more error messages 306. As depicted, the error messages 306 include multiple error messages 330, 336, 338, 340, 342, 344, 346. Each error message 330, 336, 338, 340, 342, 344, 346 may correspond to at least one erroneous value from among the sentinel values 304. In particular, as explained above, the schema 210 ultimately restricts received data to only include the string data type. Accordingly, each of the values 308, 314, 316, 318, 320, 322, 324 that do not contain strings will result in a corresponding error message 330, 336, 338, 340, 342, 344, 346.

The contents of the error messages 306 may specify a type of error and/or why a corresponding sentinel value 304 does not comply with the schema 210. For example, the error message 330 may correspond to the value 308 and state that data type null is not compatible with the schema 210. The error messages 336, 338 may correspond to the values 314, 316 and specify that the data type numbers are not compatible with the schema 210. The error messages 340, 342 may correspond to the values 318, 320 and specify that the data type booleans are not compatible with the schema 210. The error messages 344, 346 may correspond to the values 322, 324 and may specify that the data type arrays are not compatible with the schema 210. In addition to identifying data type errors, the error messages 306 may also, in certain implementations, identify incorrect or incompatible data values. For example, if the schema 210 required strings of five characters or shorter in length, the error messages 306 may include an error message corresponding to value 312 stating "Invalid Data Value: Strings must be length 5 or less," or similar.

Turning to procedure 350, a feature map 352 may be created based on the error messages 306. For example, a computing device may parse the error messages 306 for indications of incompatible data types and/or data contents. In particular, one or more keyword searches may be performed on the error messages 306 for keywords such as "invalid," "not valid," "incompatible," "not compatible," "unsupported," "not supported," and the like. Keywords may be selected based on formatting and/or phrasing of error messages produced by the validation service 302. Error messages containing the identified keywords may be further analyzed. For example, an error message 336 containing "not compatible" may be analyzed for the phrase "data type", and the next word after "data type" (e.g., "numbers") may be identified as an unsupported data type. Processing may proceed this way for all error messages 330, 336, 338, 340, 342, 344, 346 in the error messages 306. For example, by processing all of the error messages 306, the computing device may determine that data types numbers, objects, arrays, booleans, and null are not supported. By elimination, it may be determined that the string data type is the only supported data type.

The error messages 306 may also be analyzed for contents requirements, such as a length requirement for a string, a type requirement for an array, and/or a value requirement for a number. In certain instances, error messages for invalid data values may include different terms than error messages for unsupported data types and may be identified using different keywords. In one implementation, for instance, such error messages may include "length" (e.g., "strings must be 5 characters or less," "strings must be 10 characters or longer"), "value" (e.g., "numbers must have value from 1-1000," "numbers must have a value less than 10,000," "strings may only have values 'Carl,' 'Bob,' or 'Alice'"), and/or "contents" (e.g., "contents of the array cannot include numbers," "contents of the array cannot include null values"). Based on these keywords, one or more contents requirements may be identified within the error message (e.g., "5 characters or less," "10 characters or longer," "1-1000," "less than 10,000," "cannot include numbers," "cannot include null values").

In practice, it should be understood that the contents and phrasing of the error messages may differ (e.g., depending on the validation service used). Accordingly, the keywords may be selected based on the contents and phrasing of the error messages produced by a selected validation service and may therefore differ for various implementations. All such implementations are hereby considered within the scope of the present disclosure.

The feature map 352 may be created based on the analysis of the error messages 306 to indicate supported data types. In certain implementations, the feature map 352 may contain all data types along with an indication of whether the data type is supported or unsupported. For example, as depicted the feature map 352 indicates that strings are supported, but that numbers, arrays, booleans, and null values are not supported. In additional or alternative implementations, the feature map may only include indications of supported data types. For example, the feature map may only store an indication of the string data type to indicate that strings are the only supported data type for the schema 210 and may not include indications of numbers, arrays, booleans, and null values to indicate that these data types are not supported by the schema 210.

In still further implementations, where one or more contents requirements are identified, the feature map 352 may also store indications of the contents requirements. For example, if the schema 210 only supported strings of length 5 characters or less, a maximum length of 5 characters may be stored in association with the string data type in the feature map 352. Similar contents requirements (e.g., minimum length, allowed values, maximum values, minimum values, supported array contents, supported array sizes) may also be stored in association with various data types, depending on a received schema's requirements.

A corresponding UI element 354 may then be selected based on the feature map 352. For example, the UI element 354 may be selected based on supported data types and/or supported data contents identified within the feature map 352. As depicted, because the schema 210 supports strings, the UI element 354 is selected as a text box to allow a user to type in the information. Each data type may have one or more corresponding UI elements. For example, and referring to FIG. 4, numbers may correspond to text entry boxes (such as the UI element 354), sliders 402, and/or drop-down menus 404. As another example, the boolean data type may correspond to selection boxes 408 and/or drop-down menus 410. In still further implementations, UI elements 406 for arrays may include multiple UI elements for each entry in the array, along with an element to add more entries to the array. In certain instances, a schema may support multiple data types, which may require multiple UI elements. For example, a drop-down menu may be used to select between different, supported data types and a corresponding UI element may appear below the drop-down menu when the user selects a data type. In one specific example, the data schema may support text, number, and boolean data types. In such instances, the selected UI element may include a first element to select between the different types (e.g., a drop-down menu to select between "text", "number", and "boolean" options). Based on the user's selection in the first element, a second element may be displayed (e.g., a text box if the user selects the text or number options, selection boxes if the user selects the boolean option).

Figure 4:
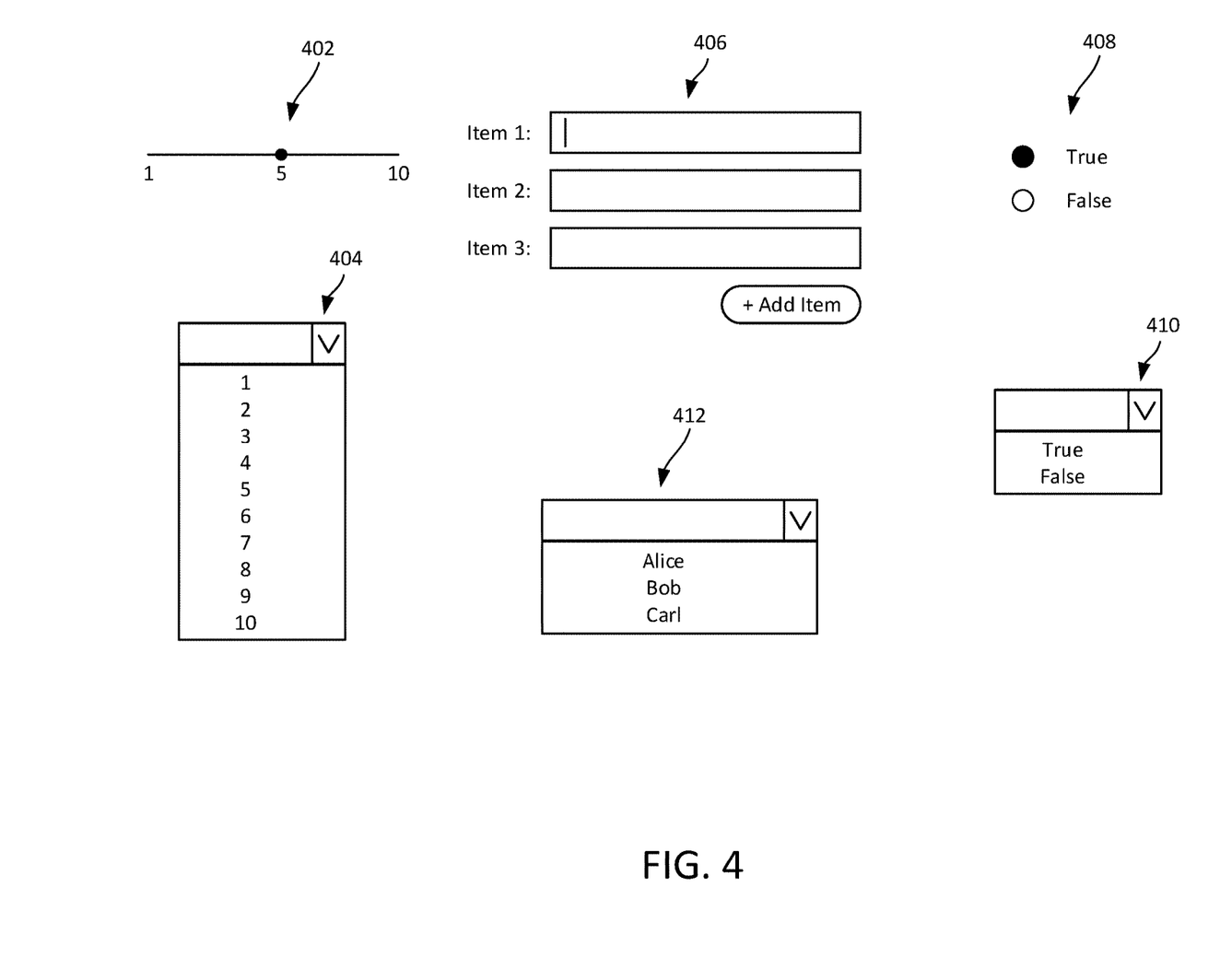
FIG. 4 illustrates user interface elements according to exemplary embodiments of the present disclosure.

In still further implementations, the corresponding UI element 354 may be generated to enforce contents requirements. In certain instances, the UI element 354 may be generated to enforce one or more formatting requirements. For example, if the schema 210 only supports strings of 5 characters or less, the UI element 354 may be generated as a text box that only allows entry of up to 5 characters, or that presents an error when a string is longer than 5 characters. As another example, where only numbers within a certain range are allowed, the UI element may be a number slider or drop-down menu that only includes the allowed range of values. As a further example, where an array is only allowed to have certain contents (e.g., strings), only such elements may be included for entries in the array. In other instances, the UI element may be generated to enforce one or more contents constraints that limit the valid contents to a predetermined, enumerated set of values. For example, if the contents requirements specify that only a predetermined, enumerated set of valid contents are acceptable (e.g., using an enum condition), the UI element may include a drop-down menu 412 that contains the predetermined, enumerated set of valid contents for selection.

As will be appreciated by one skilled in the art, many of the above UI elements may be combined depending on the data type and contents requirements indicated within the feature map 352. All such combinations are considered within the scope of the present disclosure.

Figure 5:
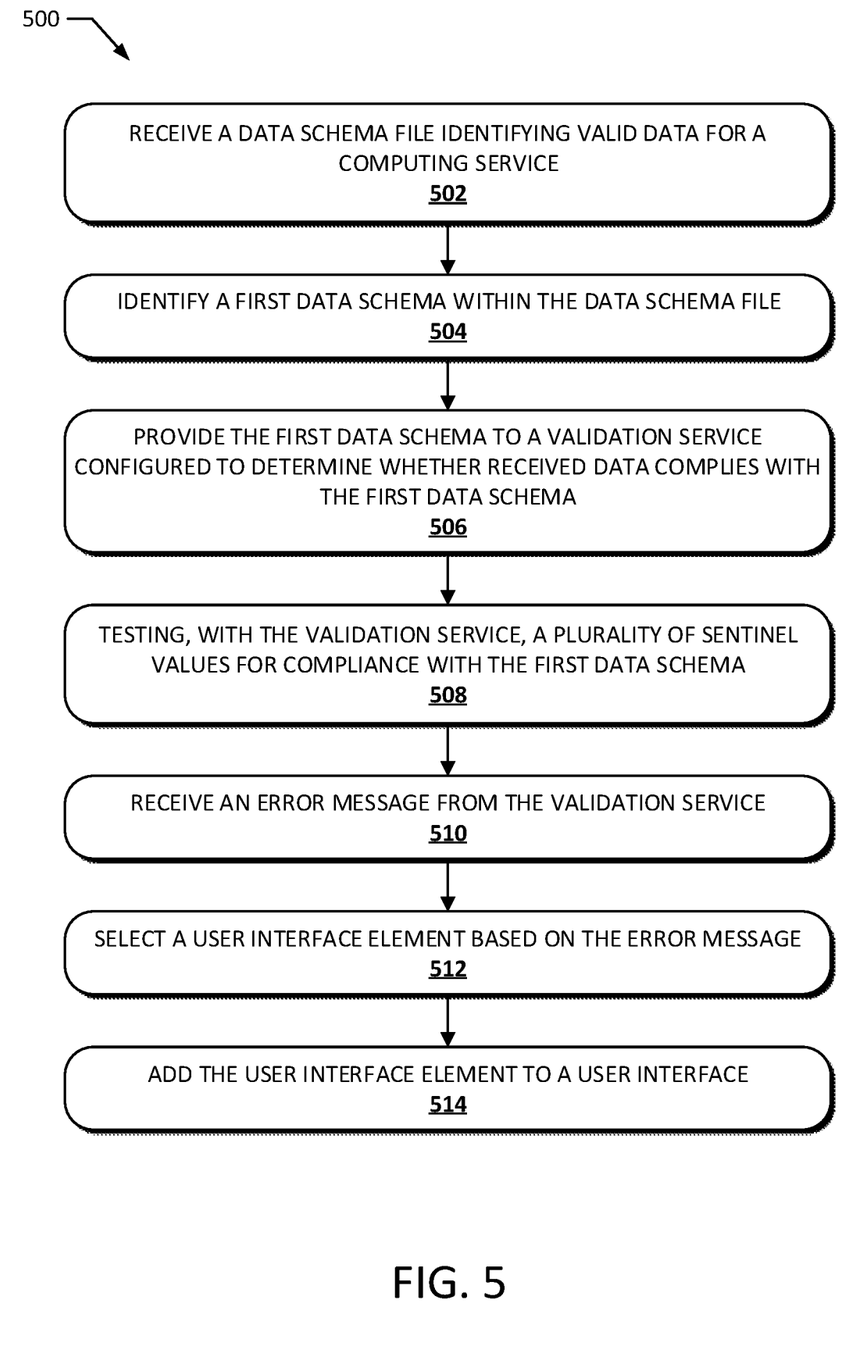
FIG. 5 illustrates a method for generating user interfaces according to an exemplary embodiment of the present disclosure.

FIG. 5 illustrates a method 500 for generating user interfaces according to an exemplary embodiment of the present disclosure. The method 500 may be performed to generate and select UI elements 124, 126, 128, 354 for a user interface 108 associated with a data schema file 106. The method 500 may be implemented on a computer system, such as the system 100. For example, the method 500 may be implemented by the computing device 102. The method 500 may also be implemented by a set of instructions stored on a computer readable medium that, when executed by a processor, cause the computer system to perform the method 500. For example, all or part of the method 500 may be implemented by a processor and a memory of the computing device 102. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving a data schema file that identifies valid data for a computing service (block 502). For example, a computing device 102 may receive a data schema file 106 that identifies valid data for a computing service 104. The computing device 102 may receive the data schema file 106 in response to a request to link the computing service 104 to the computing device 102 (e.g., to execute software applications on behalf of a user requesting connection to the computing service 104).

A first data schema may be identified within the data schema file (block 504). For example, a first data schema 122, 210 may be identified within the data schema file 106. In particular, the data schema file 106 may contain multiple data schema 118, 120, 122, 202, 210 that identify valid data for different data fields within the data schema file 106. Each of the data schema 118, 120, 122, 202, 210 may include separate requirements and/or conditions for valid data and may correspond to different data fields of the data schema file 106. The first data schema 122, 210 may be identified as a standalone, complete data schema within the data schema file 106. The syntax for defining a valid and complete data schema may differ according to the type of data schema defined within the data schema file 106. For example, where the data schema file 106 contains JSON Schema statements, individual data schema 118, 120, 122, 202, 210 within the data schema file 106 may be contained within "{ }" brackets, and may contain multiple conditions contained within brackets. Additionally or alternatively, the data schema 118, 120, 122, 202, 210 may contain titles 204, 212, which may be used to identify individual data schema (and corresponding data fields) of the data schema file 106.

The first data schema may be provided to a validation service (block 506). For example, the first data schema 122, 210 may be provided to a validation service 112, 302. The validation service 112, 302 may be configured to determine whether received data complies with the requirements of the first data schema 122, 210. For example, and as explained above, the validation service 112, 302 may process received data values according to the requirements specified within the first data schema 122, 210 and may determine whether the received data values comply with the requirements. If not, the validation service 112, 302 may be configured to generate one or more error messages 114, 306.

A plurality of sentinel values may be tested with the validation service for compliance with the first data schema (block 508). For example, a plurality of sentinel values 110, 304 may be tested with the validation service 112, 302 for compliance with the first data schema 118, 210. The computing device 102 may provide sentinel values 110, 304 to the validation service 112, 302 along with the first data schema 118, 210. Additionally or alternatively, the validation service may store sentinel values 110, 304 for use in testing the requirements of received data schema. As explained above, the sentinel values may contain data of different types and with different contents (e.g., empty values, long strings, large/small numerical values) to trigger error messages for different types of contents requirements and/or data type requirements within the data schema 118, 210.

An error message may be received from the validation service (block 510). For example, an error message 114, 306 may be received from the validation service 112, 302. If any of the sentinel values 110, 304 fail to comply with the first data schema 118, 210, the validation service 112, 302 may generate one or more error messages 114, 306. The error messages 114, 306 may specify one or more error conditions (e.g., incompatible data types, invalid data contents). For example, the data schema 118 may only support certain enumerated values: a boolean true value, the number 10, and the string "order". In such instances, a sentinel value containing an array may receive an error message indicating an incompatible data type error condition (e.g., "Invalid Data Type: Arrays Are Not Compatible"). A sentinel value containing the number 1234567890 may receive an error message indicating a contents requirement error condition (e.g., "Invalid Data Value: Numbers Must Contain Value of 10"). In certain implementations, more than one error message may be received (e.g., if more than one sentinel value 110, 304 fails to comply with the first data schema, if one sentinel value 110, 304 generates multiple error messages).

A user interface element may be selected based on the error message (block 512). For example, a UI element 128, 354 may be selected based on the error message 114, 306. To select the UI element, a feature map 116, 352 may be created based on one or more received error messages 114, 306. As explained above, the feature map 116, 352 may be created to identify supported and/or unsupported data types and to identify any contents requirements for data of a particular type. For example, creating the feature map 116, 352 may include determining that no error messages were received for sentinel values associated with a data type (e.g., the sentinel values 310, 312 associated with the string data type). Based on this determination, the data type may be added to the feature map as a valid data type. As another example, creating the feature map 116, 352 may include determining that an error message was received for a sentinel value associated with a data type (e.g., the sentinel values 318, 320 for the boolean data type). Based on this determination, and the contents of the error message (as explained above), the data type may be added to the feature map 116, 352 as an invalid data type and/or may be excluded from the feature map 116, 352 to indicate that the data type is not valid. As a further example, creating the feature map 116, 352 may include determining that a received error message indicates a contents requirement for a particular data type. In such instances, an indication of the contents requirement may be added to a corresponding data type in the feature map 116, 352.

As also explained above, certain supported data types may have corresponding UI elements, such as text boxes, sliders, selection boxes, and drop-down menus. In instances where the feature map 116, 352 only contains data type requirements, the UI element 128, 354 may be selected based only on supported data types. For example, where only a single data type (e.g., numbers) is supported for the data schema 122, 210, the UI element 128, 354 may be selected as one of the UI elements associated with the supported data types (e.g., a text box that only allows numerical characters to be entered). In instances where the feature map 116, 352 includes contents requirements identified based on the error conditions, the UI element 128, 354 may also be selected based on the error conditions. Certain types of contents requirements may have corresponding UI elements. For example, numerical range content requirements may correspond to numerical sliders and/or drop-down menus. As another example, enumerated contents requirements may correspond to a drop-down menu. In such instances, the UI element 128, 354 may be selected as the UI element corresponding to the contents requirements identified in the feature map 116, 352.

In instances where one or more supported data types and/or one or more contents requirements correspond to different types of UI elements, multiple UI elements may be selected. For example, the feature map 116, 352 may indicate that arrays of booleans are supported along with numbers from 1-10 and enumerated string values "Alice," "Bob," and "Charlie." The array may correspond to a UI element of multiple selection boxes or menus, the numbers from 1-10 may correspond to a slider or drop-down menu, and the enumerated string values may correspond to a drop-down menu. In such instances, multiple UI elements may be selected, such as a drop-down menu to select between different data types (e.g., a drop-down menu with selections between arrays, numbers, and strings). Multiple additional UI elements may also be selected for each of the contents requirements, such as multiple selection boxes for an array of booleans, a numeric slider for the restricted number values, and a drop-down menu for the enumerated strings. Once a data type is selected within the drop-down menu, one of the additional UI elements may be displayed (e.g., beneath the drop-down menu) based on a corresponding contents requirement for the selected data type.

The user interface element may then be added to a user interface (block 514). For example, the UI element 128, 354 may be added to a corresponding user interface 108. The user interface 108 may be displayed via a software platform accessible by the computing device 102 or another computing device (e.g., a computing device associated with a user). For example, the user interface 108 may be a web interface that includes one or more UI elements. The UI element 128, 354 may be added to the interface, e.g., by adding corresponding instructions (e.g., HTML instructions, Javascript instructions, and the like) for the UI elements to instructions for the user interface 108.

In certain implementations, all or part of the method 500 may be repeated. For example, the data schema file 106 may contain multiple data schema 118, 120, 122, 202, 210. In such instances, portions of the method 500 (e.g., blocks 504, 506, 508, 510, 512, 514) may be repeated for at least a subset of the data schema 118, 120, 122, 202, 210. Repeating the method 500 in this way may add at least one UI element to the user interface 108 for each of the data schemas 118, 120, 122, 202, 210. In such instances, the UI elements may be added to the user interface 108 based on the order in which the data schemas 118, 120, 122, 202, 210 were identified in the data schema file 106. For example, a UI element corresponding to the first data schema within the data schema file 106 may be above and/or to the left of subsequent data schema in the data schema file 106.

In this manner, the method 500 may enable the computing device 102 to automatically generate a user interface for a received data schema file. Furthermore, by relying on the validation service instead of structurally parsing the contents of data schema, the method 500 is able to accurately process and create user interfaces for complicated data schema, including data schema that contain composition conditions and/or include enumerated data values that greatly restrict or combine acceptable data contents. This enables automated generation of user interfaces for complex data schema conditions, improving the accuracy of how such interfaces present the requirements of a particular data schema. Accordingly, these techniques enable automated interfaces to accurately incorporate additional computing services (e.g., new APIs) that have more complicated data schema into user-facing applications.

Figure 6:
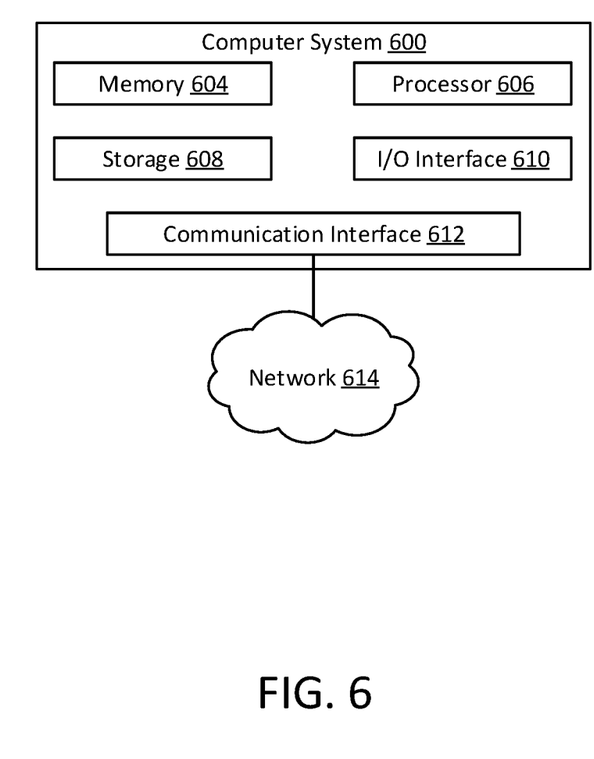
FIG. 6 illustrates a computer system according to an exemplary embodiment of the present disclosure.

FIG. 6 illustrates an example computer system 600 that may be utilized to implement one or more of the devices and/or components discussed herein, such as the computing device 102, the computing service 104, and the validation services 112, 302. In particular embodiments, one or more computer systems 600 perform one or more blocks or procedures of one or more methods described or illustrated herein. In particular embodiments, one or more computer systems 600 provide the functionalities described or illustrated herein. In particular embodiments, software running on one or more computer systems 600 performs one or more blocks or procedures of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more blocks or procedures of one or more methods described or illustrated herein. As an example and not by way of limitation, one or more computer systems 600 may perform in real time or in batch mode one or more blocks or procedures of one or more methods described or illustrated herein. One or more computer systems 600 may perform at different times or at different locations one or more blocks or procedures of one or more methods described or illustrated herein, where appropriate.

In particular embodiments, computer system 600 includes a processor 606, memory 604, storage 608, an input/output (I/O) interface 610, and a communication interface 612. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 606. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person (i.e., a user) and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 614 and any suitable communication interface 612 for the network 614. As an example and not by way of limitation, the network 614 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementations, this disclosure contemplates any suitable communication interface implementation.

The computer system 602 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-PIN-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or blocks, any of these embodiments may include any combination or permutation of any of the components, elements, features, functions, operations, or blocks described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving, via a processor, a data schema file identifying valid data formats for communicating with a computing service, wherein the data schema file comprises a set of data schemas;
identifying, via the processor, a first data schema from the set of data schemas within the data schema file, the first data schema having one or more required data types for the computing service;
providing, via the processor, the first data schema to a validation service configured to determine a set of compliant sentinel values for the first data schema;
testing, via the processor and with the validation service, a set of candidate sentinel values for compliance with the first data schema,
wherein the set of candidate sentinel values correspond to supported data types of a user interface, and
wherein the set of compliant sentinel values for the first data schema is a subset of the set of candidate sentinel values;
receiving, via the processor, a set of validation messages from the validation service,
wherein each validation message comprises at least one sentinel value compatible with the one or more required data types of the first data schema for the computing service; and
responsive to each validation message in the set of validation messages indicating compliance with the first data schema:
selecting, by the processor, a user interface element for addition to the user interface that is based on the set of compliant sentinel values; and
adding, via the processor, the selected user interface element to the user interface.

2. The method of claim 1, wherein the set of sentinel values include at least one of (i) base values for a plurality of data types supported by the data schema file, (ii) base values for a plurality of data formats for at least one data type, and (iii) at least one random value.

3. The method of claim 2, wherein the data schema file is a JSON Schema file and the plurality of data types include at least a subset of string, number, enum, array, boolean, and/or null data types.

4. The method of claim 1, further comprising:
creating, via the processor, a feature map based on the set of validation messages that identifies at least one valid data type for the first data schema; and
selecting, via the processor, the user interface element based on the at least one valid data type identified by the feature map.

5. The method of claim 4, wherein creating the feature map includes:
determining, via the processor, that a first sentinel value corresponding to a first data type resulted in at least one validation message in the set of validation messages; and
adding, via the processor, the first data type to the feature map as a valid data type.

6. The method of claim 4, wherein creating the feature map includes:
determining, via the processor, that a second sentinel value corresponding to at least a second data type resulted in an error message; and
at least one of (i) omitting, via the processor, the second data type from the feature map and (ii) adding, via the processor, the second data type to the feature map as an invalid data type.

7. The method of claim 4, wherein creating the feature map includes:
identifying, via the processor, a contents requirement within the set of validation messages;
identifying, via the processor, a third data type that corresponds to the contents requirement; and
adding, via the processor, the third data type to the feature map as a valid data type, wherein the contents requirement is stored in association with the third data type.

8. The method of claim 7, wherein the user interface element has at least one of a formatting constraint created based on the contents requirement and/or a contents constraint created based on the contents requirement.

9. The method of claim 7, wherein the contents requirement identifies a predetermined set of valid contents and the user interface element is a selection element that contains the predetermined set of valid contents.

10. The method of claim 7, wherein the user interface element is selected to be at least one of (i) a text box if the at least one valid data type includes a string data type and/or a number data type, (ii) a selection element if the contents requirement includes an enumerated list of valid contents, and/or (iii) a slider if the at least one valid data type includes a number data type.

11. The method of claim 4, wherein, if the at least one valid data schema indicates two or more valid data types, the user interface element includes (i) a first element to select between the two or more valid data types and (ii) a second element that is displayed based on a selected data type of the selection element.

12. The method of claim 1, wherein the first data schema includes at least one composite condition that combines two or more data requirements.

13. The method of claim 1, wherein the data schema file identifies valid data for an application programming interface (API).

14. The method of claim 13, wherein the data schema file identifies valid data that can be provided to and/or received from the API.

15. The method of claim 13, wherein the API executes on a first computing device and the data schema file is received from the API when the API is connected to a second computing device.

16. A system comprising:
a processor; and
a memory storing instructions which, when executed by the processor, cause the processor to:
  receive a data schema file identifying valid data formats for communicating with a computing service, wherein the data schema file comprises a set of data schemas;
  identify a first data schema from the set of data schemas within the data schema file, the first data schema having one or more required data types for the computing service;
  provide the first data schema to a validation service configured to determine a set of compliant sentinel values for the first data schema;
  test, with the validation service, a set of candidate sentinel values for compliance with the first data schema,
    wherein the set of candidate sentinel values correspond to supported data types of a user interface, and
    wherein the set of compliant sentinel values for the first data schema is a subset of the set of candidate sentinel values;
  receive a set of validation messages from the validation service,
    wherein each validation message comprises at least one sentinel value compatible with the one or more required data types of the first data schema for the computing service; and
  responsive to each validation message in the set of validation messages indicating compliance with the first data schema:
    select a user interface element for addition to the user interface that is based on the set of compliant sentinel values; and
    add the selected user interface element to the user interface.

17. The system of claim 16, wherein the instructions further cause the processor to:
  create a feature map based on the set of validation messages that identifies at least one valid data type for the first data schema; and
  select the user interface element based on the at least one valid data type identified by the feature map.

18. The system of claim 17, wherein the instructions further cause the processor, while creating the feature map, to:
  determine that a first sentinel value corresponding to a first data type resulted in at least one validation message in the set of validation messages; and
  add the first data type to the feature map as a valid data type.

19. The system of claim 17, wherein the instructions further cause the processor, while creating the feature map, to:
  determine that a second sentinel value corresponding to at least a second data type resulted in an error message; and
  at least one of (i) omit the second data type from the feature map and (ii) add the second data type to the feature map as an invalid data type.

20. The system of claim 17, wherein the instructions further cause the processor, while creating the feature map, to:
  identify a contents requirement within the set of validation messages;
  identify a third data type that corresponds to the contents requirement; and
  add the third data type to the feature map as a valid data type, wherein the contents requirement is stored in association with the third data type.

* * * * *